(12) United States Patent
Wise et al.

(10) Patent No.: US 12,730,449 B2
(45) Date of Patent: Sep. 8, 2026

(54) DE-CENTRALIZED TRAFFIC-AWARE NAVIGATIONAL PLANNING FOR MOBILE ROBOTS

(71) Applicant: Skild-Fetch LLC, Pittsburgh, PA (US)

(72) Inventors: Melonee Wise, San Jose, CA (US); Aaron Hoy, San Jose, CA (US); Derek King, Seattle, WA (US); Micaela Angeli, Lincolnshire, IL (US); Chinmay Shah, San Jose, CA (US)

(73) Assignee: Skild-Fetch LLC, Pittsburgh, PA (US)

( * ) Notice: Subject to any disclaimer, the term of this patent is extended or adjusted under 35 U.S.C. 154(b) by 126 days.

(21) Appl. No.: 17/976,469

(22) Filed: Oct. 28, 2022

(65) Prior Publication Data

US 2024/0142985 A1 May 2, 2024

(51) Int. Cl.
*G05D 1/00* (2024.01)

(52) U.S. Cl.
CPC ......... *G05D 1/0274* (2013.01); *G05D 1/0214* (2013.01); *G05D 1/0217* (2013.01); *G05D 1/0238* (2013.01)

(58) Field of Classification Search
CPC .. G05D 1/0274; G05D 1/0214; G05D 1/0217; G05D 1/0238; G05D 2111/17; G05D 1/2464; G05D 1/2469; G05D 1/242; G05D 1/622; G05D 2105/28; G05D 2107/70; G05D 2109/10; G05D 1/693
See application file for complete search history.

(56) References Cited

U.S. PATENT DOCUMENTS

| | | | | |
|---|---|---|---|---|
| 8,364,309 | B1 * | 1/2013 | Bailey | G05D 1/0259 700/245 |
| 11,016,491 | B1 * | 5/2021 | Millard | G05D 1/0217 |
| 2007/0150093 | A1 | 6/2007 | Nagatsuka et al. | |
| 2011/0231016 | A1 * | 9/2011 | Goulding | G05D 1/0088 901/1 |
| 2017/0157769 | A1 | 6/2017 | Aghamohammadi et al. | |
| 2019/0286145 | A1 * | 9/2019 | LaFary | G05D 1/0255 |
| 2020/0089252 | A1 | 3/2020 | Kim et al. | |
| 2020/0409376 | A1 | 12/2020 | Ebrahami et al. | |
| 2021/0004012 | A1 * | 1/2021 | Marchetti-Bowick | G05D 1/0221 |

(Continued)

OTHER PUBLICATIONS

Merriam-Webster, "locomotive." 2009. (Year: 2009).*

(Continued)

*Primary Examiner* — Stephanie T Su
(74) *Attorney, Agent, or Firm* — Fenwick & West LLP

(57) ABSTRACT

A method includes: storing an occupancy map for a facility, the occupancy map defining: for each of a plurality of regions in the facility, a current occupancy for a present time value, and for each of at least a subset of the regions, a future occupancy for a subsequent time value; generating a path from a current pose of a mobile robot in the facility to a target pose, based on the current and future occupancies; in response to execution of the path at the mobile robot, capturing sensor data representing a vicinity of the mobile robot; detecting an obstacle from the sensor data; and transmitting occupancy data for generating an updated occupancy map including an updated future occupancy for at least one of the subset of regions, the occupancy data including obstacle data indicating a location of the obstacle, and path data defining the path.

30 Claims, 10 Drawing Sheets

(56) References Cited

U.S. PATENT DOCUMENTS

2021/0089040 A1* 3/2021 Ebrahimi Afrouzi ........................ G05D 1/0248
2023/0147624 A1* 5/2023 Gaud .................. G05D 1/0291 701/26

OTHER PUBLICATIONS

MIT Urban Operations Research, 6.1 “Definition of Terms and Notation,” 2010. (Year: 2010).*
Carnegie Mellon University, “Robot Pose—Representation and Transformation,” 2020. (Year: 2020).*
International Search Report and Written Opinion for International Patent Application No. PCT/US2023/035683 mailed on Feb. 15, 2024.

* cited by examiner

DE-CENTRALIZED TRAFFIC-AWARE NAVIGATIONAL PLANNING FOR MOBILE ROBOTS

BACKGROUND

Autonomous or semi-autonomous mobile robots can be deployed in facilities such as warehouses, manufacturing facilities, healthcare facilities, or the like, e.g., to transport items within the relevant facility. To navigate a facility, a mobile robot captures sensor data (e.g., images, or the like) and detects obstacles within the sensor data. The mobile robot may then generate a path, e.g., towards a target location, taking into account any detected obstacles. In facilities containing multiple such robots, however, paths generated by separate robots may conflict with one another.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
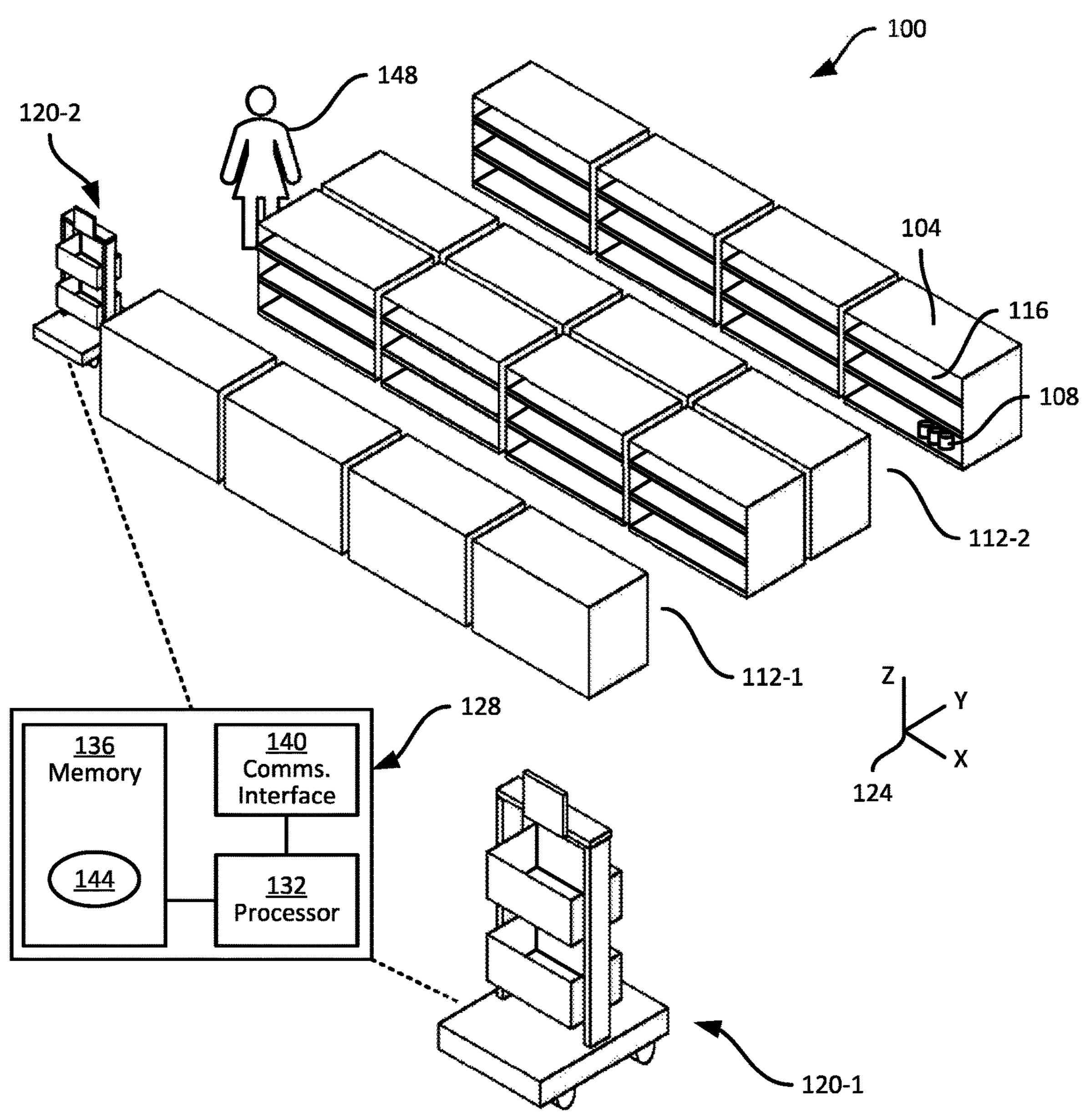
FIG. 1 is a diagram of an item-handling mobile robot deployed in a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method including: storing an occupancy map for a facility, the occupancy map defining: (i) for each of a plurality of regions in the facility, a current occupancy corresponding to a present time value, and (ii) for each of at least a subset of the regions, a future occupancy corresponding to a time value subsequent to the present time value; generating a path from a current pose of a mobile robot in the facility to a target pose of the mobile robot, based on the current occupancies and the future occupancies; in response to execution of the path at the mobile robot, capturing sensor data representing a vicinity of the mobile robot; detecting an obstacle from the sensor data; and transmitting, from the mobile robot, occupancy data for generating an updated occupancy map including an updated future occupancy for at least one of the subset of regions, the occupancy data including (i) obstacle data indicating a location of the obstacle, and (ii) path data defining the path.

Additional examples disclosed herein are directed to a mobile robot, including: a memory storing an occupancy map for a facility, the occupancy map defining: (i) for each of a plurality of regions in the facility, a current occupancy corresponding to a present time value, and (ii) for each of at least a subset of the regions, a future occupancy corresponding to a time value subsequent to the present time value; and a processor configured to: generate a path from a current pose of the mobile robot in the facility to a target pose, based on the current occupancies and the future occupancies; in response to execution of the path, capture sensor data representing a vicinity of the mobile robot; detect an obstacle from the sensor data; and transmit occupancy data for generating an updated occupancy map including an updated future occupancy for at least one of the subset of regions, the occupancy data including (i) obstacle data indicating a location of the obstacle, and (ii) path data defining the path.

Further examples disclosed herein are directed to a method, including: generating a path from a current pose of a mobile robot in a facility to a target location, based on an occupancy map for the facility, the occupancy map defining a current occupancy for each of a plurality of regions in the facility; during execution of the path, detecting obstacles from sensor data captured via a sensor of the mobile robot, and storing detected locations of the obstacles; in response to determining that the path is blocked, selecting a detected obstacle with a detected location outside a field of view of the sensor; generating an observational path to bring the observed location of the selected obstacle into the sensor field of view; during execution of the observational path, capturing further sensor data and determining from the further sensor data whether the detected location remains obstructed; and modifying execution of the path based on whether the detected location remains obstructed.

Still further examples disclosed herein are directed to a mobile robot, including: a locomotive assembly; a sensor; and a processor configured to: generate a path from a current pose of a mobile robot in a facility to a target location, based on an occupancy map for the facility, the occupancy map defining a current occupancy for each of a plurality of regions in the facility; control the locomotive assembly to execute the path; during execution of the path, detect obstacles from sensor data captured via the sensor, and store detected locations of the obstacles; in response to determining that the path is blocked, select a detected obstacle with a detected location outside a field of view of the sensor; generate an observational path to bring the observed location of the selected obstacle into the sensor field of view; during execution of the observational path, capture further sensor data and determine from the further sensor data whether the detected location remains obstructed; and modify execution of the path based on whether the detected location remains obstructed.

FIG. 1 illustrates an interior of a facility 100, such as a warehouse, a manufacturing facility, a healthcare facility, or the like. The facility 100 includes a plurality of support structures 104 carrying items 108. In the illustrated example, the support structures 104 include shelf modules, e.g., arranged in sets forming aisles 112-1 and 112-2 (collectively referred to as aisles 112, and generically referred to as an aisle 112; similar nomenclature is used herein for other components). As shown in FIG. 1, support structures 104 in the form of shelf modules include support surfaces 116 supporting the items 108. The support structures 104 can also include pegboards, bins, or the like, in other examples.

In other examples, the facility 100 can include fewer aisles 112 than shown, or more aisles 112 than shown in FIG. 1. The aisles 112, in the illustrated example, are formed by sets of eight support structures 104 (four on each side of each aisle 112). The facility 100 can also have a wide variety of other aisle layouts, however. As will be apparent, each aisle 112 is a space open at the ends, and bounded on either side by support structures 104. The aisles 112 can be travelled by humans, vehicles, and the like. In still further examples, the facility 100 need not include aisles 112, and can instead include assembly lines, or the like.

The items 108 may be handled according to a wide variety of processes, depending on the nature of the facility 100. In some examples, the facility 100 is a shipping facility, distribution facility, or the like, and the items 108 can be placed on the support structures 104 for storage, and subsequently retrieved for shipping from the facility. Placement and/or retrieval of the items 108 to and/or from the support structures can be performed or assisted by mobile robots 120-1, 120-2 deployed in the facility 100. A greater number of robots 120 can be deployed in the facility 100 than the robots 120-1 and 120-2 shown in FIG. 1, for example based on the size and/or layout of the facility 100. Components of the robot 120 are discussed below in greater detail. In general, each robot 120 in the facility 100 is configured to transport items 108 within the facility 100.

Each robot 120 can be configured to track its pose (e.g., location and orientation) within the facility 100, for example according to a coordinate system 124 previously established in the facility 100. The robot 120 can navigate autonomously within the facility 100, e.g., travelling to locations assigned to the robot 120 to receive and/or deposit items 108. The items 108 can be deposited into or onto the robot 120, and removed from the robot 120, by human workers and/or mechanized equipment such as robotic arms and the like deployed in the facility 100. The locations to which each robot 120 navigates can be assigned to the robot 120 by a central server 128. That is, the server 128 is configured to assign tasks to the robots 120. Each task can include either or both of one or more locations to travel to, and one or more actions to perform at those locations. For example, the server 128 can assign a task to a given robot 120 to travel to a particular location defined in the coordinate system 124, and to await the receipt of one or more items 108 at that location.

Tasks can be assigned to the robots 120 via the exchange of messages between the server 128 and the robots 120, e.g., over a suitable combination of local and wide-area networks. The server 128 can be deployed at the facility 100, or remotely from the facility 100. In some examples, the server 128 is configured to assign tasks to robots 120 at multiple facilities, and need not be physically located in any of the individual facilities.

The server 128 includes a processor 132, such as one or more central processing units (CPU), graphics processing units (GPU), or dedicated hardware controllers such as application-specific integrated circuits (ASICs). The processor 132 is communicatively coupled with a non-transitory computer readable medium such as a memory 136, e.g., a suitable combination of volatile and non-volatile memory elements. The processor 132 is also coupled with a communications interface 140, such as a transceiver (e.g., an Ethernet controller or the like) enabling the server 128 to communicate with other computing devices, such as the mobile robots 120. The memory 136 can store a plurality of computer-readable instructions executable by the processor 132, such as an application 144 whose execution by the processor 132 configures the processor 132 to manage certain aspects of the operations of the mobile robots 120, including assigning tasks and providing occupancy data, as discussed below.

To navigate to a given location in the facility 100 (e.g., a target location assigned to the mobile robot 120 by the server 128), the mobile robot 120 can be configured to capture sensor data representing at least a portion of the physical environment of the robot 120 (i.e., the surroundings of the robot 120). The robot 120 can then be configured to detect obstacles in its vicinity from the sensor data, and navigate around or away from the obstacles as needed.

As will be apparent to those skilled in the art, the facility 100 can contain a wide variety of obstacles. For example, as seen in FIG. 1, obstacles that the mobile robot 120 may need to navigate around include the support structures 104, humans such as a worker 148, and mobile equipment such as forklifts, other mobile robots, and the like. Obstacles encountered during travel through the facility 100 by a mobile robot 120 can also include stationary obstacles such as boxes, pallets, and the like. In other words, the obstacles encountered by a mobile robot 120 during navigation can include permanent or semi-permanent static obstacles, such as the support structures 104, as well as temporary static obstacles, such as boxes or the like, and mobile obstacles such as other robots 120 and the worker 148.

A mobile robot 120 can be configured to generate a path from a current pose of the robot 120 to a target location based on an occupancy map indicating whether various regions of the facility 100 are currently occupied or not. Such an occupancy map need not indicate in purely binary terms whether a region is occupied. For example, the occupancy map can indicate a likelihood that a region is occupied, e.g., based on how recently the mobile robot 120 has observed that region. Even in systems using occupancy maps that indicate obstruction probabilities rather than binary indications as noted above, the occupancy maps may only provide information defining current occupancy of each region in the facility 100. Such occupancy maps may not reflect future positions of mobile obstacles such as other robots 120, and therefore two or more robots 120 may plan paths that traverse substantially the same region of the facility 100 at substantially the same time, because when the paths were generated that region was unoccupied. Paths that overlap in both space and time may cause congestion and/or result in triggering collision-avoidance mechanisms in the robots 120, reducing the efficiency with which the robots 120 travel the facility 100.

As discussed below, the robots 120 and the server 128 are therefore configured to perform additional functions to enable traffic-aware path planning at the robots 120. In other words, the functions implemented in the facility 100 by the robots 120 and server 128 facilitate the generation of paths at each robot 120 that take into account not only the current occupancy of various regions in the facility 100, but also the future occupancy of certain regions. The resulting paths can therefore be traffic-aware, in that the paths are generated to avoid congestion. Generation of such paths can also be at least partially decentralized, in that paths can be generated at the robots 120 themselves rather than at the server 128, which could impose a significant computational burden on the server 128.

Figure 2:
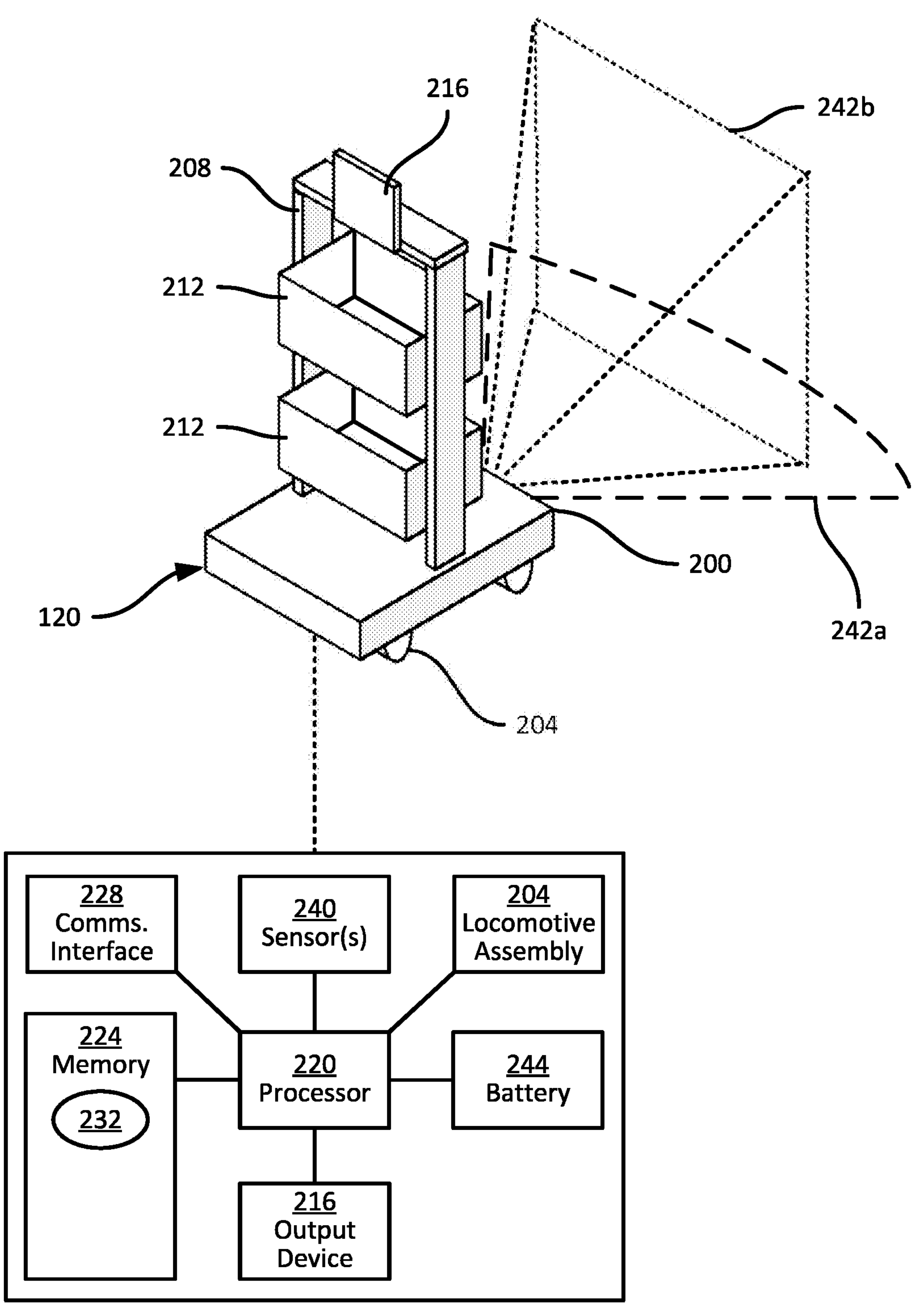
FIG. 2 is a diagram of certain components of a mobile robot of FIG. 1.

Before discussing the functionality implemented by the robots 120 and the server 128 in greater detail, certain components of the robots 120 are discussed with reference to FIG. 2. As shown in FIG. 2, each robot 120 includes a chassis 200 supporting various other components of the robot 120. In particular, the chassis 200 supports a locomotive assembly 204, such as one or more electric motors driving a set of wheels, tracks, or the like. The locomotive assembly 204 can include one or more sensors such as a wheel odometer, an inertial measurement unit (IMU), and the like.

The chassis 200 also supports receptacles, shelves, or the like, to support items 108 during transport. For example, the robot 120 can include a selectable combination of receptacles 212. In the illustrated example, the chassis 200 supports a rack 208, e.g., including rails or other structural features configured to support receptacles 212 at variable heights above the chassis 200. The receptacles 212 can therefore be installed and removed to and from the rack 208, enabling distinct combinations of receptacles 212 to be supported by the robot 120.

The robot 120 can also include an output device, such as a display 216. In the illustrated example, the display 216 is mounted above the rack 208, but it will be apparent that the display 216 can be disposed elsewhere on the robot 120 in other examples. The display 216 can include an integrated touch screen or other input device, in some examples. The robot 120 can also include other output devices in addition to or instead of the display 216. For example, the robot 120 can include one or more speakers, light emitters such as strips of light-emitting diodes (LEDs) along the rack 208, and the like.

The chassis 200 of the robot 120 also supports various other components, including a processor 220, e.g., one or more central processing units (CPUs), graphics processing units (GPUs), or dedicated hardware controllers such as application specific integrated circuits (ASICs). The processor 220 is communicatively coupled with a non-transitory computer readable medium such as a memory 224, e.g., a suitable combination of volatile and non-volatile memory elements. The processor 220 is also coupled with a communications interface 228, such as a wireless transceiver enabling the robot 120 to communicate with other computing devices, such as the server 128 and other robots 120.

The memory 224 stores various data used for autonomous or semi-autonomous navigation, including an application 232 executable by the processor 220 to implement navigational and other task execution functions. In some examples, the above functions can be implemented via multiple distinct applications stored in the memory 224.

The chassis 200 can also support a sensor 240, such as one or more cameras and/or depth sensors (e.g., lidars, depth cameras, time-of-flight cameras, or the like) coupled with the processor 220. The sensor(s) 240 are configured to capture image and/or depth data depicting at least a portion of the physical environment of the robot 120. Data captured by the sensor(s) 240 can be used by the processor 220 for navigational purposes, e.g., path planning, obstacle avoidance, and the like, as well as for updating a map of the facility in some examples.

The sensors 240 have respective fields of view (FOVs). For example, a first FOV **242*a* corresponds to a laser scanner, such as a lidar sensor disposed on a forward-facing surface of the chassis 200. The FOV 242*a* can be substantially two-dimensional, e.g., extending forwards in a substantially horizontal plane. A second FOV 242*b* corresponds to a camera (e.g., a depth camera, a color camera, or the like) also mounted on the forward-facing surface of the chassis 200. As will be apparent, a wide variety of other optical sensors can be disposed on the chassis 200 and/or the rack 208, with respective FOVs 242**.

The components of the robot 120 that consume electrical power can be supplied with such power from a battery 244, e.g., implemented as one or more rechargeable batteries housed in the chassis 200 and rechargeable via a charging port (not shown) or other suitable charging interface.

Figure 3:
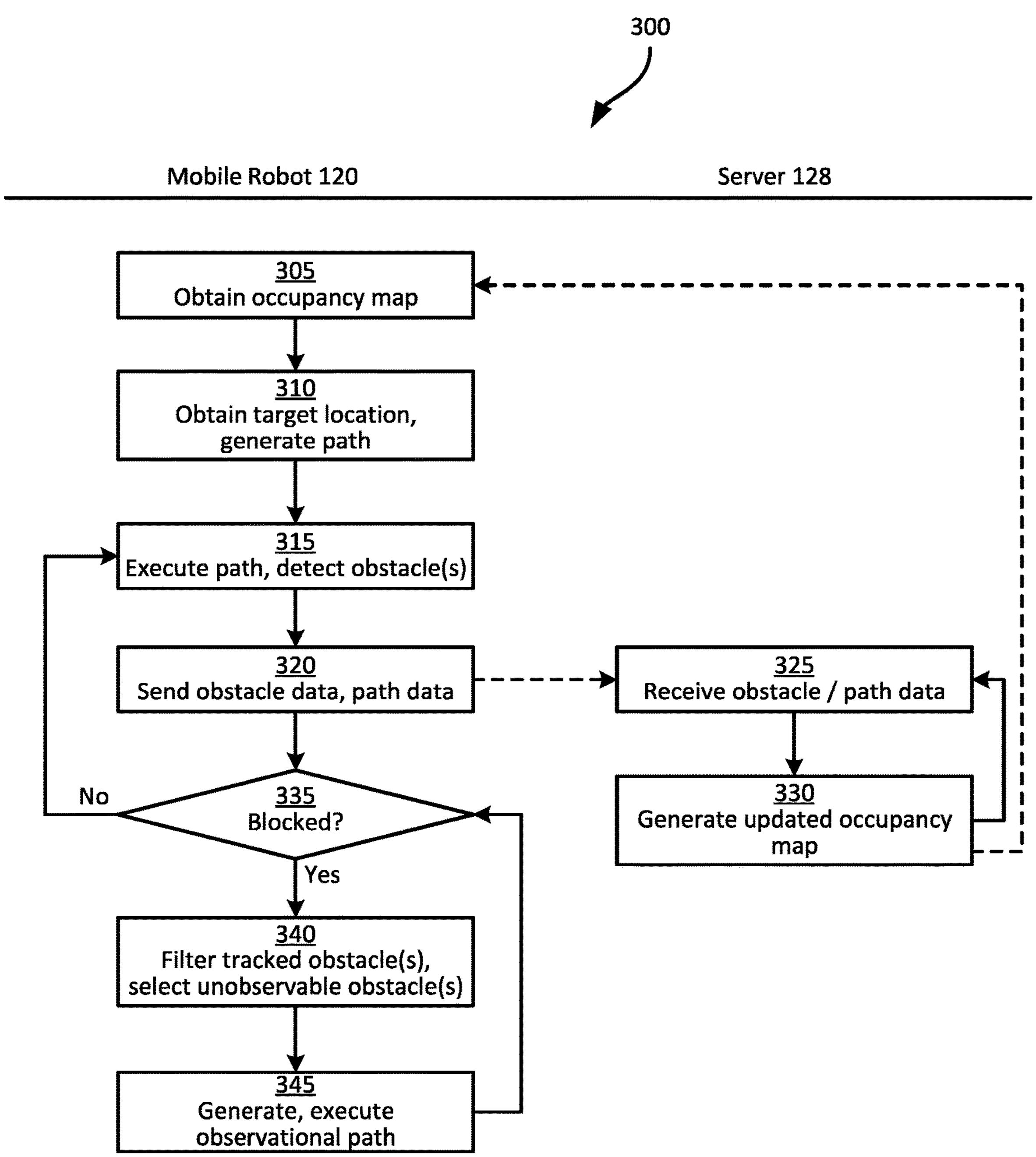
FIG. 3 is a flowchart illustrating a method of traffic-aware navigational planning.

Turning to FIG. 3, a method 300 of decentralized traffic-aware navigational planning is illustrated. The method 300 is described below in conjunction with its example performance in the facility 100. In particular, as indicated in FIG. 3, certain blocks of the method 300 are performed by the mobile robot 120, e.g., via execution of the application 232 by the processor 220. Other blocks of the method 300 are performed by the server 128, e.g., via execution of the application 144 by the processor 132. In some cases, examples of which are noted below, functions implemented by the server 128 in FIG. 3 can be implemented by the robots 120, and vice versa, e.g., to optimize computational load on either or both of the robots 120 and the server 128.

At block 305, the mobile robot 120 is configured to obtain an occupancy map for the facility 100. The occupancy map can be obtained, for example, from the server 128, which stores and updates a central copy of the occupancy map for distribution to the robots 120. Updating and provision of the occupancy map to the robots 120 is an iterative process, as will be understood from the discussion below. The occupancy map can be obtained at block 305, for example, via a request from the robot 120 to the server 128, or by pushing the occupancy map from the server 128 to the robot 120 (e.g., in response to an update to the occupancy map performed at the server 128). The occupancy map can be obtained in full from the server 128, e.g., initially. When the robot 120 has a local copy of the occupancy map (e.g., previously received from the server 128), the occupancy map can be obtained at block 305 in the form of a record of changes from the previous occupancy map, to reduce the volume of data transmitted from the server 128 to the robot 120.

The occupancy map can be a simplified representation of the facility 100, e.g., dividing the facility 100 into a plurality of regions and defining a current occupancy for each such region. The current occupancy indicates whether the region is currently (e.g., at a time the current occupancy was last updated) occupied, e.g., by a permanent obstacle such as a support structure 104, or by a mobile obstacle such as another robot 120. The occupancy map can also, as discussed below, define a future occupancy for certain regions of the facility 100. The future occupancy indicates whether the corresponding region will be occupied at a specific future time, in contrast to the current occupancy. Some regions of the occupancy map, in other words, can include two or more occupancies, e.g., one current occupancy and one or more future occupancies.

Figure 4:
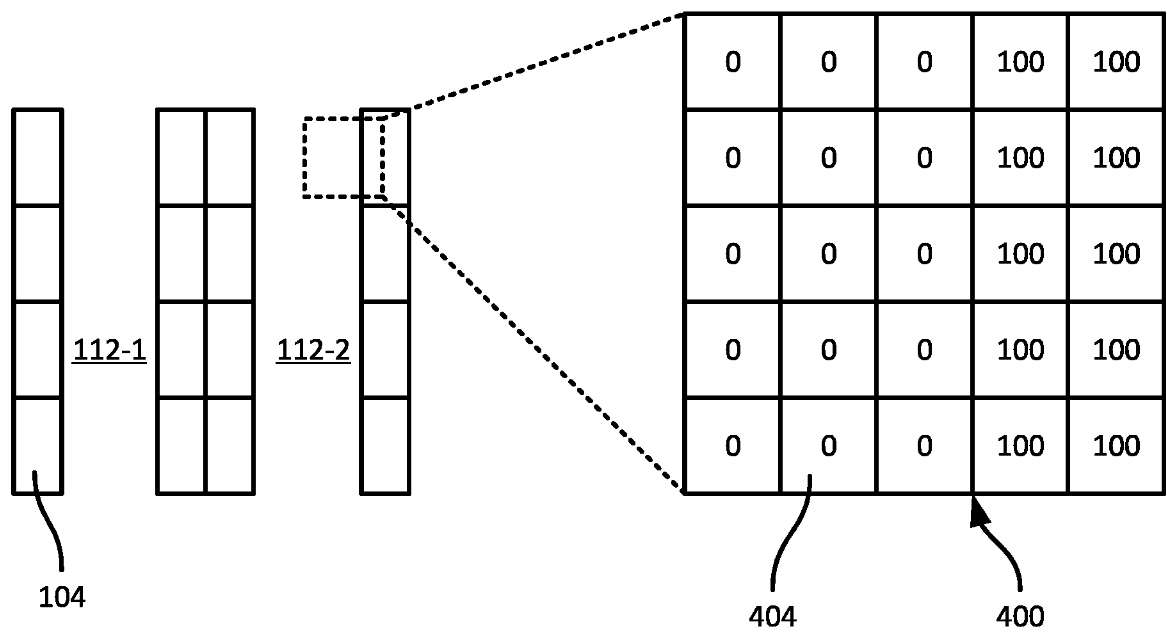
FIG. 4 is a diagram illustrating example occupancy maps used in the method of FIG. 3.
Figure 4:
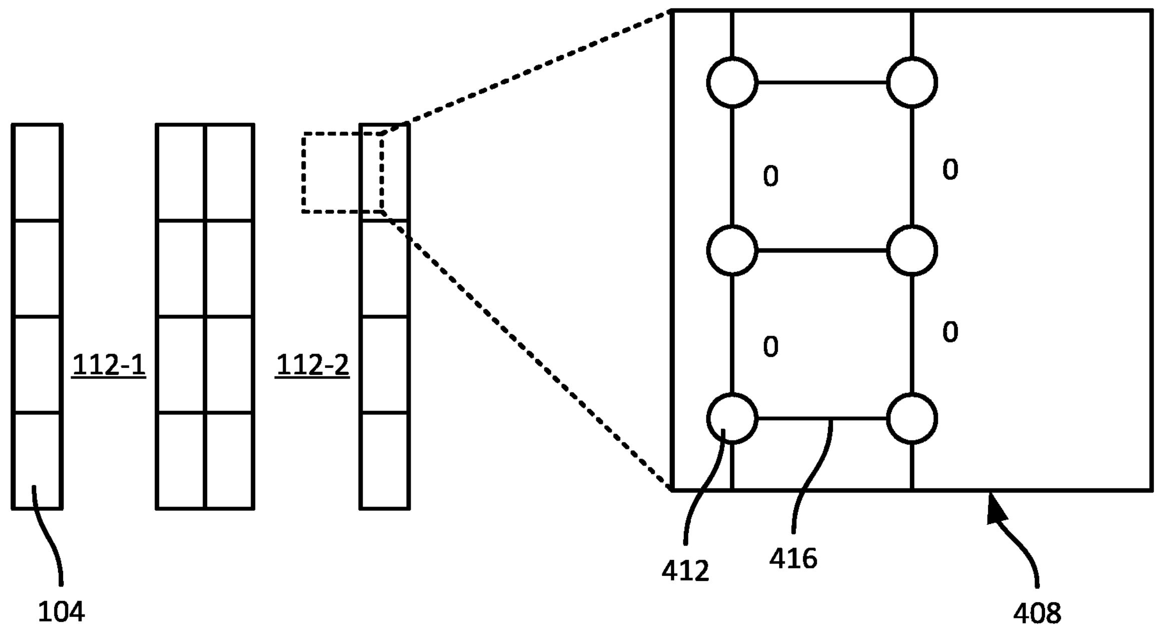

Turning to FIG. 4, two example occupancy map structures are shown. In particular, a first occupancy map 400 includes a plurality of cells 404, e.g., arranged in a grid, representing regions of the facility 100. That is, the facility 100 can be divided into the cells 404, at any suitable resolution (e.g., 5 cm×5 cm, although a wide variety of other cell sizes can be employed, balancing accuracy with computational load). The cells 404 illustrated in FIG. 4 are only a portion of the complete occupancy map corresponding to a portion of the aisle 112-2 (indicated by dashed lines). The complete occupancy map can cover the entire facility 100.

Each cell 404 contains a current occupancy, which in the illustrated example is a cost value between zero and one hundred. A value of zero can indicate empty space, through which a robot 120 can travel, while a value of one hundred can indicate occupied space, through which a robot 120 cannot travel. Values between zero and one hundred can also be employed (e.g., the current occupancy values need not be binary), e.g., to indicate a likelihood that a cell is occupied. Values closer to one hundred indicate increased confidence that the corresponding cell 404 is occupied. Certain occupancy values can be determined from a map of the facility 100 indicating the locations of permanent or semi-permanent obstacles such as the support structures 104. For example, cells 404 corresponding to the support structures 104 may always be assigned current occupancy values of one hundred. Other cells 404 can be updated over time in response to detection of obstacles by the robots 120.

FIG. 4 also illustrates another structure for the occupancy map, in the form of a lattice 408 including a plurality of nodes 412 joined by edges 416. Each node 412 represents a region in the facility 100, and each edge 416 represents a path segment between nodes 412 that can be travelled by the robots 120. The edges are associated with current occupancy values, e.g., using a scale between zero and one hundred as mentioned above in connection with the cells 404. For example, the seven edges 416 that are fully visible in the sample portion of the lattice 408 shown in FIG. 4 correspond to an open portion of the aisle 112-2, and therefore have current occupancy values of zero. The lattice 408 may reduce storage and/or computational requirements by omitting nodes 412 from regions of the facility 100 that contain permanent or semi-permanent structures such as the support structures 104. As discussed below, at least some edges 416 of the lattice 408 can also include future occupancy values. In the examples shown in FIG. 4, no cells 404 or edges 416 include future occupancy values.

Figure 5:
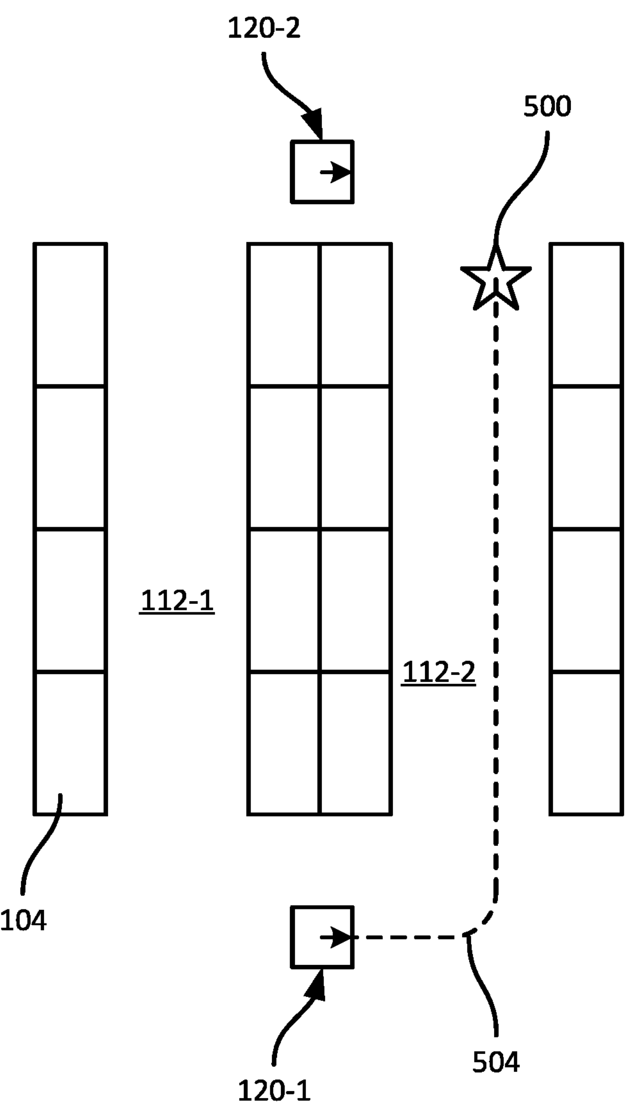
FIG. 5 is a diagram illustrating an example performance of block 310 of the method of FIG. 3.

Returning to FIG. 3, at block 310 the robot 120 is configured to obtain a target location in the facility 100, and generate a path from a current pose of the robot 120 to the target location. The target location can be obtained, for example, from the server 128 as noted earlier. In some examples, the target location can be generated locally by the robot 120. Turning to FIG. 5, an example performance of block 310 is illustrated.

As shown in FIG. 5, the robot 120-1 has received a command from the server 128 to travel from a current pose of the robot 120-1 (e.g., in between the aisles 112-1 and 112-2) to a target location 500. In response to receiving the target location 500, the robot 120-1 is configured to generate a path 504 from the current pose to the target location 500, e.g., optimizing the path 504 for minimal travel distance. The path 504 is generated based on the occupancy map received at block 305. More generally, any path generation performed at the robot 120-1 is performed based on the most recently received version of the occupancy map. In the illustrated example, the occupancy map does not contain any future occupancy values, and further indicates that the aisle 112-2 is empty. The path 504 therefore extends from the current pose of the robot 120-1 to the entrance of the aisle 112-2, and along the aisle 112-2 to the target location 500.

Referring again to FIG. 3, at block 315 the robot 120-1 is configured to execute the path generated at block 310. Execution of the path 504 includes controlling the locomotive assembly 204 to travel along the path 504, while tracking a current pose of the mobile robot 120-1, and capturing sensor data via the sensors 240 representing the surroundings of the robot 120-1 within the FOVs 242. In other words, while travelling along the path 504, the processor 220 is configured to periodically (e.g., at a frequency of about 30 Hz, although higher and lower frequencies can also be used) update a current tracked pose of the robot 120-1 in the coordinate system 124. The processor 220 is also configured to periodically (e.g., at a frequency of about 30 Hz, although higher and lower frequencies can also be used) control the sensors 240 to capture sensor data, and detect obstacles from the sensor data.

The processor 220 is further configured to store the locations of any obstacles detected from the sensor data at block 315, e.g., by detecting surfaces and/or edges in point cloud data or the like. For example, the processor 220 can store one or more sets of coordinates in the coordinate system 124 indicating the location of a detected obstacle. The stored locations of obstacles detected from the sensor data can also be referred to as observed locations.

At block 325, the processor 220 can be configured to transmit occupancy data, e.g., to the server 128 (or directly to other mobile robots 120, in some examples). The occupancy data includes obstacle data indicating observed locations of any obstacles detected during execution of the path 504, such as the coordinates mentioned above. The occupancy data can also include path data defining the path 504 itself, such as a series of poses defined in the coordinate system, optionally accompanied by velocity data (e.g., an expected travel speed of the robot 120-1 at each pose in the path 504).

Although blocks 310, 315, and 320 are shown as being performed in sequence, the execution of the path 504, detection of obstacles, and provision of path data and obstacle data to the server 128 can be performed iteratively, and in different combinations than shown in FIG. 3. For example, the processor 220 can be configured to transmit the path data mentioned above in response to generating the path at block 310, even before initiating execution of the path. The robot 120-1 can also be configured to transmit the obstacle data substantially in real time, responsive to detecting each obstacle at block 315 during execution of the path 504. In other examples, the server 128 can request path and/or obstacle data from the robots 120, and transmission of the occupancy data can therefore be performed at block 320 in response to such a request.

At block 325, the server 128 is configured to receive the occupancy data from the robot 120-1, and at block 330 the server 128 is configured to generate an updated occupancy map according to the occupancy data. For example, the server 128 can be configured to update any edge or cell corresponding to an obstacle observed by the robot 120-1, e.g., to increase the current cost value associated with those edges or cells. The server 128 can also be configured to set or update future cost values associated with regions intersected by the path 504. For example, the server 128 can determine, for each of a set of future time intervals, the expected location of the mobile robot 120-1 in the facility 100, according to the pose and velocity data provided by the mobile robot 120-1. For each future time interval, the server 128 can set a corresponding future cost value in association with the region containing the expected location of the mobile robot 120-1 for that time interval.

Figure 6:
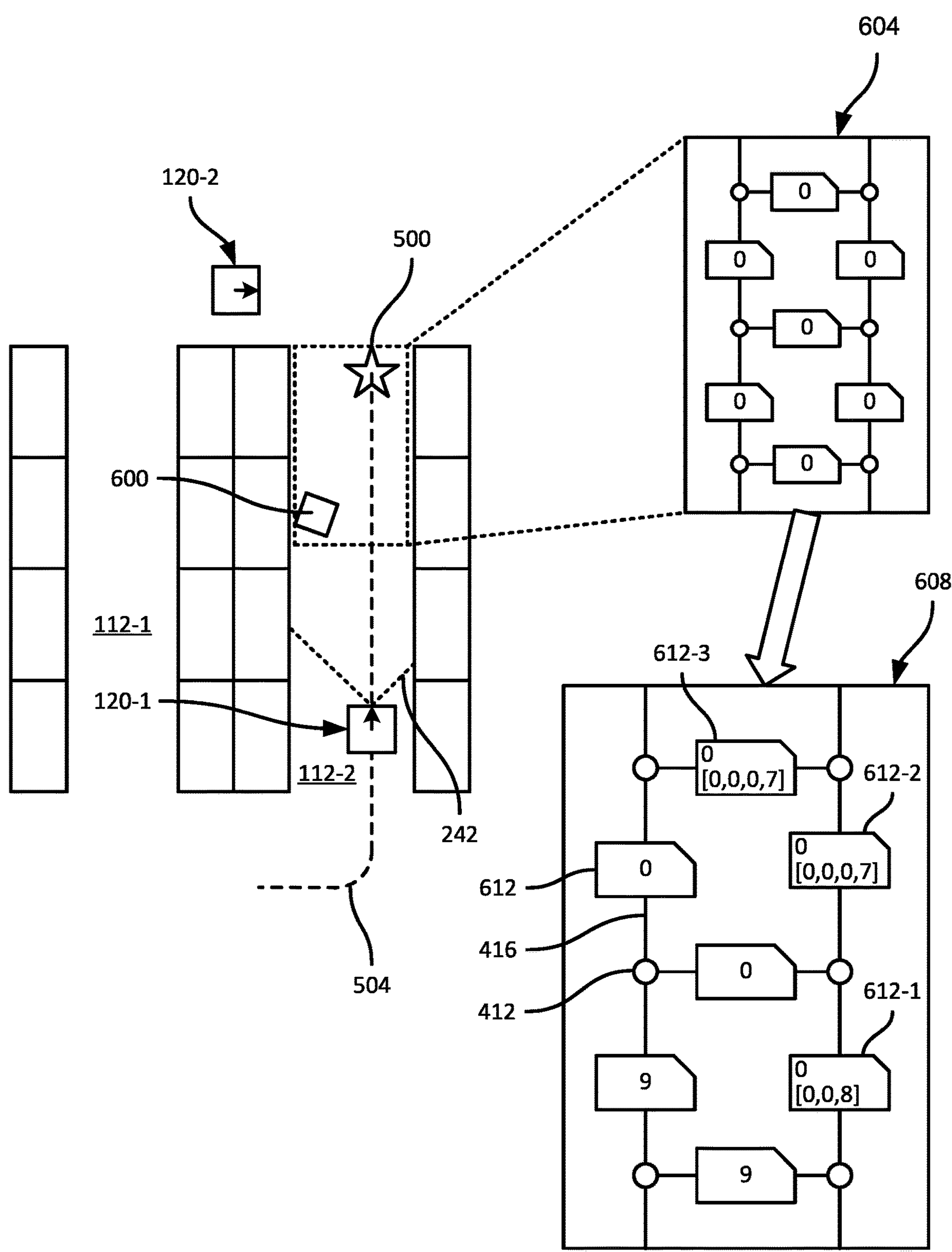
FIG. 6 is a diagram illustrating an example performance of blocks 315, 320, 325, and 330 of the method of FIG. 3.

Turning to FIG. 6, example performances of blocks 315, 320, 325, and 330 are illustrated. For example, the robot 120-1, having entered the aisle 112-2, detects an obstacle 600 such as a box, pallet, or the like in the aisle 112-2, from sensor data captured via the sensors 240. The robot 120-1 can be configured to transmit data indicating the observed location of the obstacle 600 to the server 128, as well as data defining the path 504. The server 128, in turn is configured to update the occupancy map based on the occupancy data from the robot 120-1. A portion 604 of an initial occupancy map is shown in FIG. 6, with costs of zero (indicating empty space). An updated portion 608 of the occupancy map, corresponding to the same portion of the aisle 112-2 indicated in dashed lines in FIG. 6, is also shown following a performance of block 330.

In the updated portion 608 of the occupancy map, certain edges 416 include cost data 612 defining both current cost values, and at least one future cost value. For example, the cost data 612-1 includes a current cost of zero (e.g., on a scale from zero, indicating certainly empty space, to ten, indicating certainly occupied space), and three future cost values. The future cost values can indicate a likelihood that the corresponding space will be occupied at predetermined future times, e.g., five seconds, ten seconds, and fifteen seconds in the future. In other examples, the time intervals need not be equal. For example, future cost values can correspond to future times at increasing intervals from a current time (e.g., 2 seconds, 5 seconds, 9 seconds, 15 seconds, and so on).

The cost data 612-1 indicates, in the illustrated example, an increased cost associated with the underlying edge 416 fifteen seconds in the future. Two further example cost data sets 612-2 and 612-3 indicate increased costs associated with respective edges 416 twenty seconds in the future. As will be apparent, the increased costs shown at the future times mentioned above correspond to the times at which the robot 120-1 is expected to travel the underlying edges 416. As also seen in FIG. 6, both current and future cost values may be selected by the server 128 based on either or both of a confidence level associated with an obstacle detection, and a length of time between a current time and the future time corresponding to the future cost.

For example, the current costs associated with the obstacle 600 (having values of nine) can be selected, e.g., based on a localization confidence of the robot 120-1 at the time the obstacle 600 was detected (e.g., with higher localization confidence leading to greater cost values associated with detected obstacles). Further, the future costs resulting from the path 504 can be decremented for time periods further into the future, such that the future costs (having values of seven) in the cost data 612-2 and 612-3 are lower than the future cost (having a value of eight) in the cost data 612-1.

As noted earlier, the updated occupancy map can be sent to the mobile robots 120-1 in response to requests from the robots 120, or pushed to the robots 120 by the server 128. In a separate instance of the method 300 at the robot 120-2, for example, the robot 120-2 can receive an updated map (including the updated portion 608 shown in FIG. 6) resulting from the path and obstacle data provided by the robot 120-1.

Figure 7:
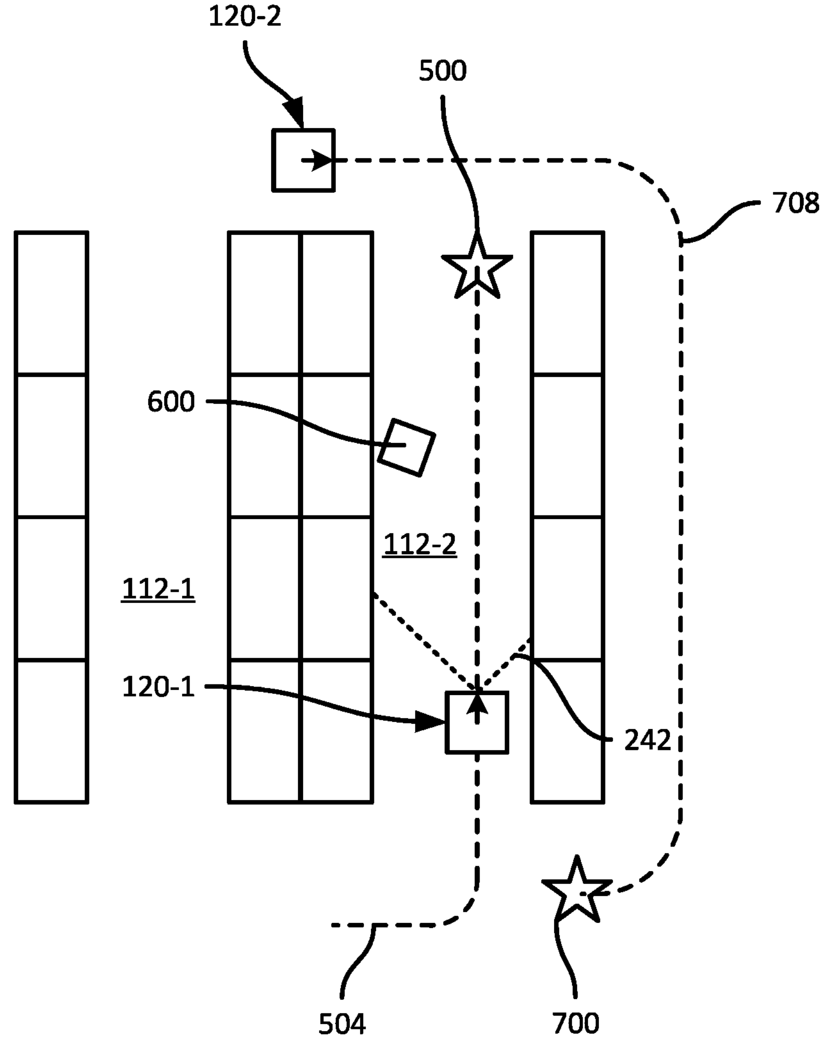
FIG. 7 is a diagram illustrating an example performance of blocks 305, 310, and 315 by another mobile robot.

At block 310, the robot 120-2 can be configured to receive a target location from the server 128, e.g., a target location 700 as shown in FIG. 7. As will be apparent from FIG. 7, the shortest path between the current pose of the robot 120-2 and the target location 700 is through the aisle 112-2. However, from the updated occupancy map, the robot 120-2 can determine that travelling through the aisle 112-2 would place the robot 120-2 adjacent to the obstacle 600 at about the same time as the robot 120-1 will be adjacent to the obstacle 600. In other words, the robots 120-1 and 120-2 may interfere with one another if the robot 120-2 plans a path through the aisle 112-2. The robot 120-2 can therefore, at block 310, generate a path 704 to the target location 700 that travels outside the aisle 112-2. Despite the path 708 being longer than a path to the target location 700 through the aisle 112-2, the path 708 may enable the robot 120-2 to arrive at the target location 700 in less time than via the aisle 112-2. As will be apparent to those skilled in the art, the path 708 can be generated locally at the robot 120-2, taking into account both the obstacle 600 (which has not been observed by the robot 120-2 itself) and the path 504 of the robot 120-1. Further, the robot 120-2 need not be aware that the robot 120-1 specifically may interfere with a path travelling through the aisle 112-2. Instead, the path generation process at the robot 120-2 simply takes into account indications from the occupancy map that a portion of the aisle 112-2 is likely to be obstructed in the future. The nature of the obstruction need not be indicated in the occupancy map.

More generally, the provision of obstacle and path data from the mobile robots 120 to the server 128, and the iterative updating of the occupancy map by the server 128 based on such obstacle and path data, allows the robots 120 to plan and execute paths through the facility 100 that benefit from obstacle detections made by other robots 120. Path generation can also incorporate future costs as noted above to reduce congestion, without requiring path generation to be performed by the server 128. As will be apparent, in some cases the server 128 may receive observations of the same obstacle from more than one robot 120. In such cases, the server 128 can update the occupancy map to retain the observation with the greatest detection confidence, to average the areas of the observations, or the like.

Figure 8:
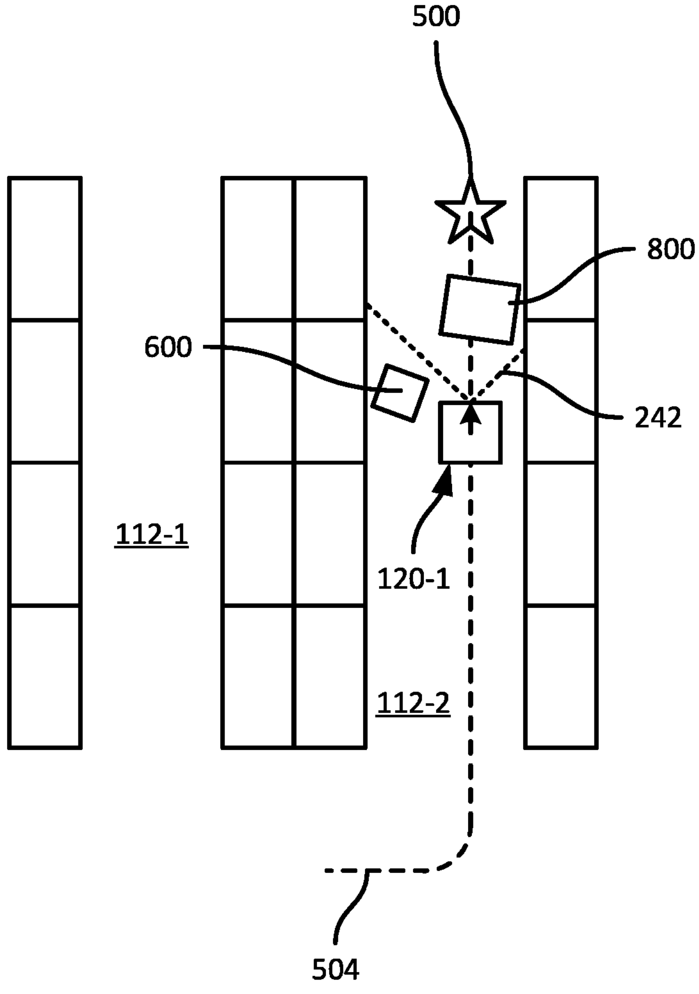
FIG. 8 is a diagram illustrating an example performance of block 335 of the method of FIG. 3.

Returning to FIG. 3, during execution of the path generated at block 310, a mobile robot 120 can determine at block 335 whether progress along the generated path is blocked. For example, the robot 120-1 can determine whether progress along the path 504 is blocked. The determination at block 335 can be affirmative, for example, when an obstacle is detected on the path 504, and the obstacle cannot readily be navigated around. For example, turning to FIG. 8, the robot 120-1 is shown having continued to travel along the path 504 towards the target location 700. However, an obstacle 800 is observed on the path 504 preventing the robot 120-1 from continuing to travel along the path 504. Further, the robot 120-1 cannot simply travel around the obstacle 800, as the obstacle 600 leaves too little space for the robot 120-1 to fit around the obstacle 800, in between the obstacles 600 and 800. The robot 120-1 is therefore blocked, and the determination at block 335 is affirmative. If the determination at block 335 were negative, the robot 120-1 would continue executing the path 504 at block 315.

Referring again to FIG. 3, at block 340 the robot 120-1 is configured to select an unobservable obstacle from among the obstacles detected via successive performances of block 315 and tracked, e.g., in the memory 224. Unobservable obstacles are obstacles previously detected from sensor data, whose observed locations no longer fall within the FOVs 242 of the sensors 240 due to movement of the robot 120-1 since detection of the obstacles. An unobservable obstacle may be maintained in the memory 224 until the observed location of that obstacle is again within the FOV 242 of at least one of the sensors 240, and/or until a predetermined period of time has elapsed (whether or not the obstacle's location has been observed again). An unobservable obstacle may, therefore, be tracked in the memory 224 of a robot 120, but may no longer be present at the previously observed location.

At block 340, therefore, the robot 120-1 is configured to select an unobservable obstacle that contributes to the blocked status of the robot 120-1. Having selected one or more unobservable obstacles, the robot 120-1 can then plan an observational path to bring the observed location(s) of the selected obstacle(s) into the FOVs 242 and determine whether the observed location(s) of the selected obstacle(s) remain occupied.

Selecting an unobservable obstacle at block 340 can include filtering the tracked obstacles to omit any obstacles stored in the memory 224 that are currently within the FOVs 242. Thus, referring to FIG. 8, the obstacle 800 is filtered out. Static, permanent or semi-permanent obstacles such as the support structures 104 can also be filtered out at block 340, as such obstacles are not expected to move and can therefore be assumed to be present without direct observation. Certain other obstacles can also be filtered out from the selection at block 340, such as other mobile robots 120, even if such robots 120 are outside the FOVs 242. For example, each robot 120 can be configured to broadcast its current pose and direction of travel, e.g., via short-range communications such as Bluetooth. Thus, there is little need to obtain direct observations of other mobile robots 120 in an attempt to resolve a blocked path.

In some examples, the robots 120 can be restricted to travelling along virtual lanes in the aisles 112, e.g., previously defined and labelled in a map at the server 128. When the robots 120 are required to remain on such lanes, the robot 120 can also filter out any obstacles that are not on such a lane, because determining that a previously observed obstacle away from a lane is no longer present does not contribute to unblocking the robot 120.

Figure 9:
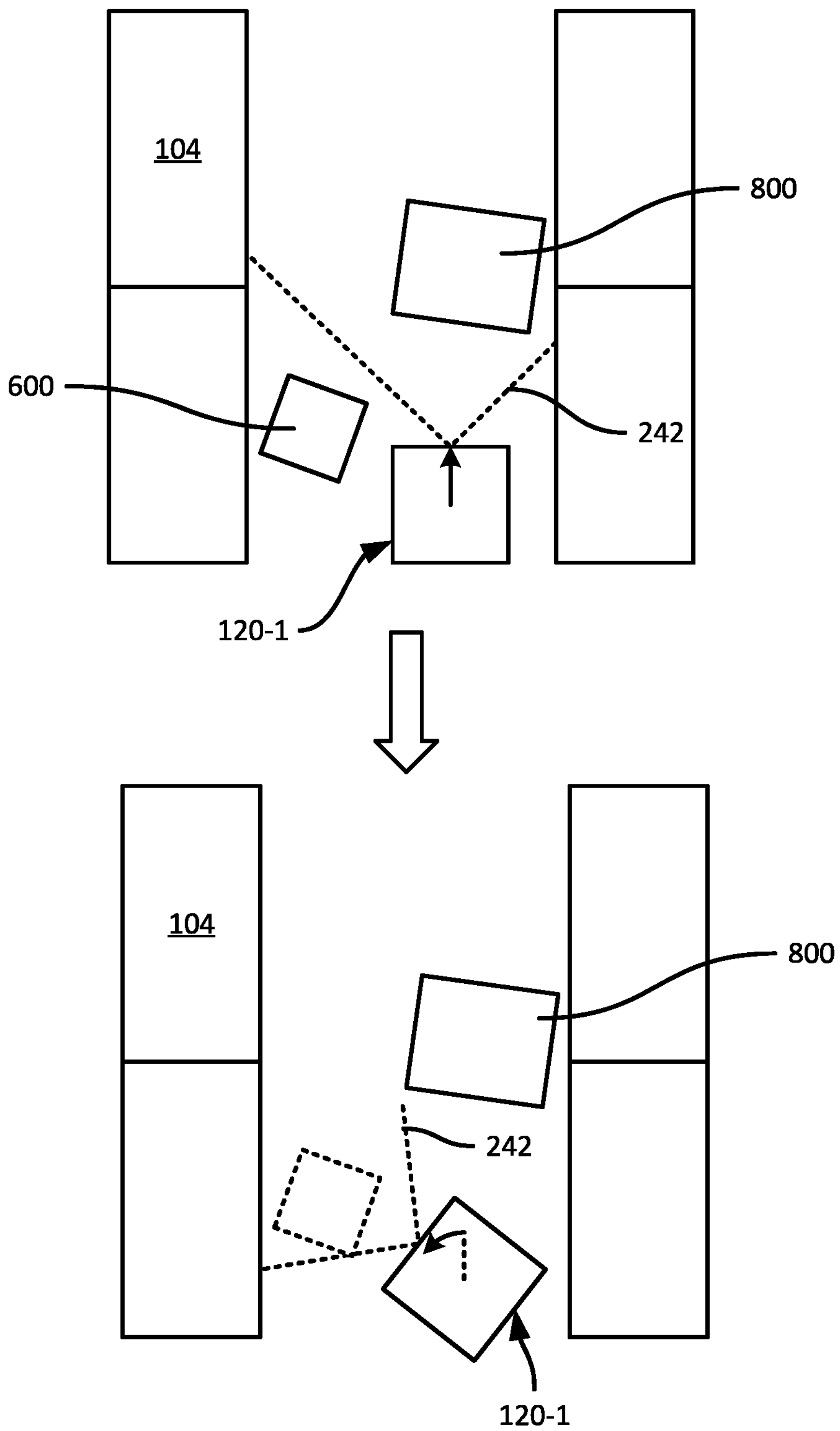
FIG. 9 is a diagram illustrating an example performance of blocks 340 and 345 of the method of FIG. 3.

Having selected at least one unobservable obstacle at block 340 (e.g., the obstacle 600 in this example), the robot 120-1 is configured, at block 345, to generate an observational path. The observational path is generated to move the FOV 242 of at least one of the sensors 240 to encompass the observed location of the selected obstacle. For example, the observational path may be a rotation on the spot, with a direction and angle selected to move the FOV 242 towards the observed location of the obstacle 600. FIG. 9 illustrates the execution of an observational path that includes a rotation from the blocked pose shown in the upper portion of FIG. 9, of about fifty degrees to the left as shown in the lower portion of FIG. 9. The rotation brings the previously observed location of the obstacle 600 (shown in dashed lines) into the FOV 242. The robot 120 can, for example, select a direction of rotation that minimizes the angle of rotation necessary to bring the observed location of the obstacle 600 into the FOV 242.

Following block 345, the robot 120-1 can return to block 335 and determine whether the path 504 remains blocked. In the example shown in FIG. 9, the obstacle 600 is no longer present, and the determination at block 335 is therefore negative because the robot 120 can navigate between the obstacle 800 and the support structure 104 to travel towards the target location 500.

If the path 504 remains blocked at block 335 (e.g., if the obstacle 600 remained present), the performance of blocks 335, 340 and 345 can be repeated, e.g., until the path can be unblocked or until no further unobservable obstacles remain to be selected and observed. If no unobservable obstacles remain, the robot 120 may wait and monitor the obstacle 800 for a predetermined period of time, to determine whether the obstacle 800 has moved. If the obstacle 800 has not moved, the robot 120 may generate a new path to the target location 500, e.g., discarding the path 504. The new path may, for example, return along the aisle 112-2 and travel outside the aisle 112-2 to the target location 500.

A wide variety of other observational paths can be employed, in addition to or instead of the rotations mentioned above. For example, the observational path can include translational motion, e.g., reversing from an initial pose of the mobile robot 120 to bring an obstacle close to the chassis 200 and below the FOV 242 into the FOV 242.

Figure 10:
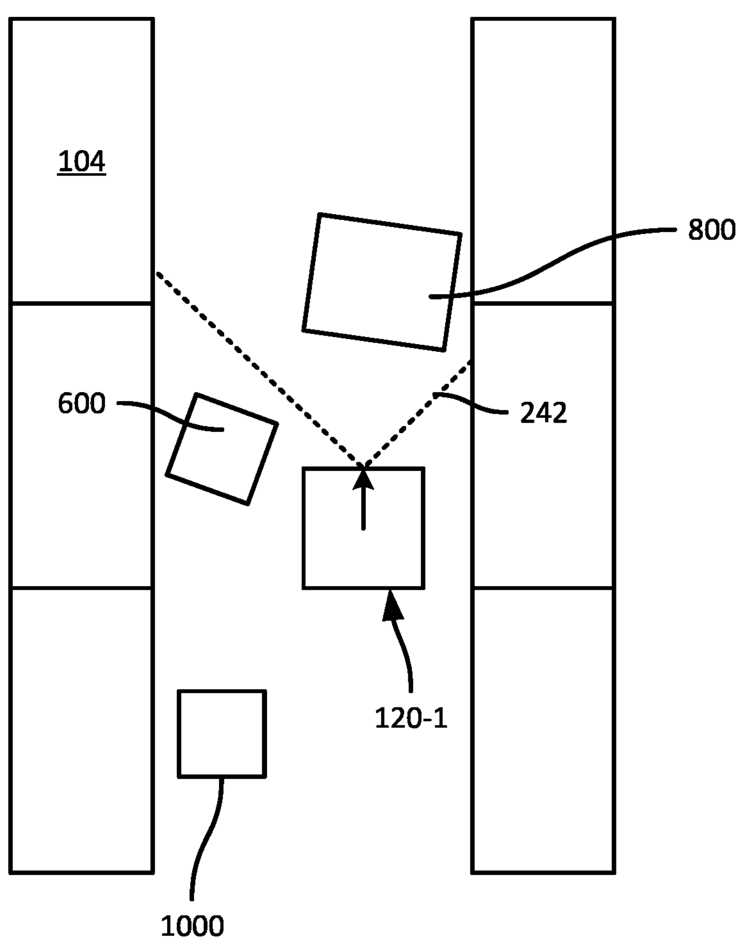
FIG. 10 is a diagram illustrating another example performance of blocks 335 and 340 of the method of FIG. 3.

In further examples, the processor 220 can be configured to rank unobservable obstacles at block 340, e.g., by generating a score for each unobservable obstacle. The processor 220 can be configured to select any unobservable obstacles with scores exceeding a threshold. Turning to FIG. 10, for example, the obstacle 600 and a further obstacle 1000 are illustrated, both previously observed by the robot 120-1 as the robot 120-1 travelled along the aisle towards the obstacle 800. At block 340, the robot 120-1 can assign scores to each of the obstacles 600 and 1000, e.g., based on either or both of the size of the obstacles (with larger obstacles receiving higher scores) and the distance of the obstacles from the robot 120-1 (with smaller distances receiving higher scores). The robot 120-1 can then be configured to select, at block 340, only the unobservable obstacles with a score that exceeds a predetermined threshold. Alternatively, the robot 120-1 may select only the highest scoring obstacle, e.g., such that at a first performance of block 340, the obstacle 1000 is not selected at block 340 due to its greater distance from the robot 120-1.

Performance of the method 300 thus allows the robots 120 to perform path generation locally, while benefitting from knowledge of paths and obstacles generated and observed by other robots 120, enabling de-centralized path planning that remains traffic-aware. Performance of the method 300 may further facilitate unblocking of the above-mentioned paths while minimizing observational motions used to determine whether previously observed obstacles remain present.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:

storing an occupancy map for a facility, the occupancy map defining:

(i) for each of a plurality of regions in the facility, a current occupancy corresponding to a present time value, and (ii) for each of at least a subset of the regions, a future occupancy corresponding to a time value subsequent to the present time value;

generating a path for a mobile robot from a current pose of the mobile robot in the facility to a target pose of the mobile robot, based on the current occupancies and the future occupancies;

causing the mobile robot to execute the path and capture sensor data representing a vicinity of the mobile robot during execution of the path;

detecting one or more obstacles from the sensor data;

in response to determining that the path is blocked, selecting an obstacle having a previously detected location outside a current field of view of a sensor of the mobile robot;

generating an observational path to bring the previously detected location of the selected obstacle into the current field of view of the sensor; and transmitting occupancy data for generating an updated occupancy map including an updated future occupancy for at least one of the subset of the regions, the occupancy data including (i) obstacle data indicating a location of the obstacle, and (ii) path data defining the path;

wherein the future occupancy indicates a future presence of another mobile robot at the corresponding region.

2. The method of claim 1, wherein the occupancy map defines a plurality of nodes each corresponding to one of the regions, and a plurality of edges extending between respective nodes; and wherein the current occupancy and the future occupancy for a given region includes a cost associated with a node corresponding to the given region.

3. The method of claim 1, wherein the occupancy map defines a grid of cells each corresponding to one of the regions; and wherein the current occupancy and the future occupancy for a given region includes a cost associated with a cell corresponding to the given region.

4. The method of claim 1, further comprising:

determining a first region corresponding to the obstacle data;

updating a current occupancy of the determined first region;

determining a second region corresponding to the path data; and updating a future occupancy of the determined second region.

5. The method of claim 4, further comprising:

transmitting an updated occupancy map, including the updated current occupancy and the updated future occupancy, to each of a plurality of mobile robots.

6. The method of claim 1, wherein the current occupancy includes a cost value; and wherein the future occupancy includes a cost value and a future time value.

7. The method of claim 6, wherein the occupancy map includes, for at least one region, a plurality of future occupancies and corresponding sequential future time values.

8. The method of claim 1, further comprising:

storing detected locations of the one or more obstacles;

during execution of the observational path, capturing further sensor data and determining from the further sensor data whether the previously detected location remains obstructed; and modifying execution of the path based on whether the previously detected location remains obstructed.

9. The method of claim 8, wherein modifying the path includes:

responsive to determining that the previously detected location is not obstructed, generating an updated path travelling through the previously detected location.

10. The method of claim 8, wherein generating the observational path includes:

selecting a direction of rotation for the mobile robot that minimizes an angle of rotation and places the previously detected location of the selected obstacle in the current field of view of the sensor.

11. A mobile robot, comprising:

a memory storing an occupancy map for a facility, the occupancy map defining:

(i) for each of a plurality of regions in the facility, a current occupancy corresponding to a present time value, and (ii) for each of at least a subset of the regions, a future occupancy corresponding to a time value subsequent to the present time value;

a locomotive assembly;

a sensor; and a processor configured to:

generate a path for the mobile robot from a current pose of the mobile robot in the facility to a target pose, based on the current occupancies and the future occupancies;

cause the locomotive assembly to execute the path and cause the sensor to capture sensor data along the path representing a vicinity of the mobile robot;

detect one or more obstacles from the sensor data;

in response to determining that the path is blocked, select an obstacle having a previously detected location outside a current field of view of the sensor;

generate an observational path to bring the previously detected location of the selected obstacle into the field of view of the sensor; and transmit occupancy data for generating an updated occupancy map including an updated future occupancy for at least one of the subset of the regions, the occupancy data including (i) obstacle data indicating a location of the obstacle, and (ii) path data defining the path;

wherein the future occupancy indicates a future presence of another mobile robot at the corresponding region.

12. The mobile robot of claim 11, wherein the occupancy map defines a plurality of nodes each corresponding to one of the regions, and a plurality of edges extending between respective nodes; and wherein the current occupancy and the future occupancy for a given region includes a cost associated with a node corresponding to the given region.

13. The mobile robot of claim 11, wherein the occupancy map defines a grid of cells each corresponding to one of the regions; and wherein the current occupancy and the future occupancy for a given region includes a cost associated with a cell corresponding to the given region.

14. The mobile robot of claim 11, wherein the processor is further configured to:

store detected locations of the one or more obstacles;

during execution of the observational path, capture further sensor data and determine from the further sensor data whether the previously detected location remains obstructed; and modify execution of the path based on whether the previously detected location remains obstructed.

15. A method, comprising:

generating a path for a mobile robot from a current pose of the mobile robot in a facility to a target location, based on an occupancy map for the facility, the occupancy map defining a current occupancy for each of a plurality of regions in the facility;

causing the mobile robot to execute the path;

during execution of the path, detecting obstacles from sensor data captured via a sensor of the mobile robot, and storing detected locations of the obstacles;

in response to determining that the path is blocked, selecting a detected obstacle with a previously detected location outside a current field of view of the sensor;

generating an observational path for the mobile robot that brings the previously detected location of the selected obstacle into the current field of view of the sensor;

during execution of the observational path, capturing further sensor data by the sensor and determining from the further sensor data whether the previously detected location remains obstructed; and modifying execution of the path based on whether the previously detected location remains obstructed;

wherein the occupancy map further defines, for each of a subset of the regions, a future occupancy indicating a future presence of another mobile robot at the corresponding region.

16. The method of claim 15, wherein modifying the path includes: responsive to determining that the previously detected location is not obstructed, generating an updated path travelling through the previously detected location.

17. The method of claim 15, wherein generating the observational path includes: selecting a direction of rotation for the mobile robot that minimizes a length of a rotational arc and places the previously determined location of the selected obstacle in the current field of view of the sensor.

18. The method of claim 15, wherein selecting the detected obstacle includes:

selecting a subset of the detected obstacles with previously detected locations outside the current field of view of the sensor;

generating a score for each of the subset of obstacles; and selecting the detected obstacle based on the scores.

19. The method of claim 18, wherein generating the score includes at least one of:

determining a size of each detected obstacle in the subset; and determining a distance from the previously detected location of each obstacle to the mobile robot.

20. The method of claim 15, wherein the occupancy map defines a plurality of nodes each corresponding to one of the regions, and a plurality of edges extending between respective nodes; and wherein the current occupancy and the future occupancy for a given region includes a cost associated with a node corresponding to the given region.

21. The method of claim 15, wherein the occupancy map defines a grid of cells each corresponding to one of the regions; and wherein the current occupancy and the future occupancy for a given region includes a cost associated with a cell corresponding to the given region.

22. The method of claim 15, wherein the occupancy map includes, for at least one region, a plurality of future occupancies and corresponding sequential future time values.

23. A mobile robot, comprising:

a locomotive assembly;

a sensor; and a processor configured to:

generate a path from a current pose of a mobile robot in a facility to a target location, based on an occupancy map for the facility, the occupancy map defining a current occupancy for each of a plurality of regions in the facility;

control the locomotive assembly to execute the path;

during execution of the path, detect obstacles from sensor data captured via the sensor, and store detected locations of the obstacles;

in response to determining that the path is blocked, select a detected obstacle with a previously detected location outside a current field of view of the sensor;

generate an observational path to bring the previously detected location of the selected obstacle into the current field of view of the sensor;

during execution of the observational path, capture further sensor data and determine from the further sensor data whether the previously detected location remains obstructed; and modify execution of the path based on whether the previously detected location remains obstructed;

wherein the occupancy map further defines, for each of a subset of the regions, a future occupancy indicating a future presence of another mobile robot at the corresponding region.

24. The mobile robot of claim 23, wherein the processor is configured to modify the path by: responsive to determining that the previously detected location is not obstructed, generating an updated path travelling through the previously detected location.

25. The mobile robot of claim 23, wherein the processor is configured to generate the observational path by: selecting a direction of rotation for the mobile robot that minimizes a length of a rotational arc and places the previously detected location of the selected obstacle in the current field of view of the sensor.

26. The mobile robot of claim 23, wherein the processor is configured to select the detected obstacle by:

selecting a subset of the detected obstacles with previously detected locations outside the current field of view of the sensor;

generating a score for each of the subset of obstacles; and selecting the detected obstacle based on the scores.

27. The mobile robot of claim 26, wherein the processor is configured to generate the score by at least one of:

determining a size of each detected obstacle in the subset; and determining a distance from the previously detected location of each obstacle to the mobile robot.

28. The mobile robot of claim 23, wherein the occupancy map defines a plurality of nodes each corresponding to one of the regions, and a plurality of edges extending between respective nodes; and wherein the current occupancy and the future occupancy for a given region includes a cost associated with a node corresponding to the given region.

29. The mobile robot of claim 23, wherein the occupancy map defines a grid of cells each corresponding to one of the regions; and wherein the current occupancy and the future occupancy for a given region includes a cost associated with a cell corresponding to the given region.

30. The mobile robot of claim 23, wherein the occupancy map includes, for at least one region, a plurality of future occupancies and corresponding sequential future time values.

* * * * *